Oct. 28, 1969  J. L. KLINCK  3,474,618
REWIND MECHANISM FOR AN ELECTRIC TIMEPIECE
Filed April 28, 1967  2 Sheets-Sheet 1

INVENTOR
JOHN L. KLINCK

BY *Leblanc & Shur*

ATTORNEY.

Oct. 28, 1969     J. L. KLINCK     3,474,618
REWIND MECHANISM FOR AN ELECTRIC TIMEPIECE
Filed April 28, 1967     2 Sheets-Sheet 2
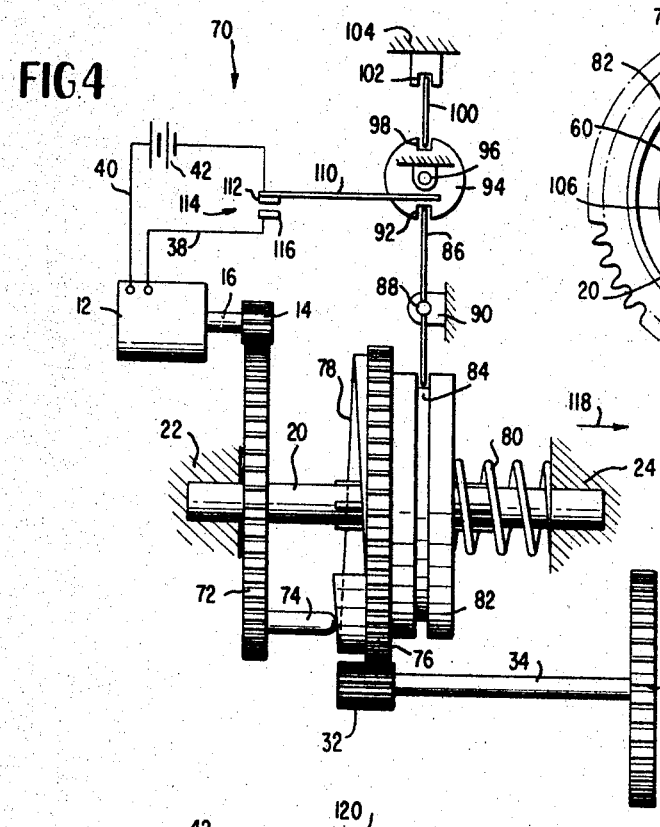
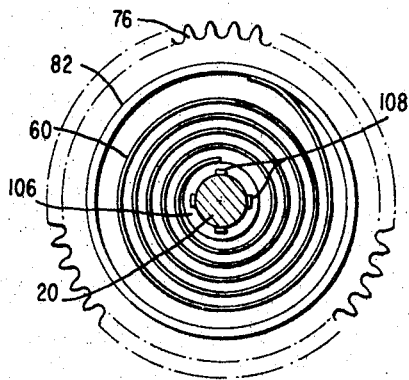
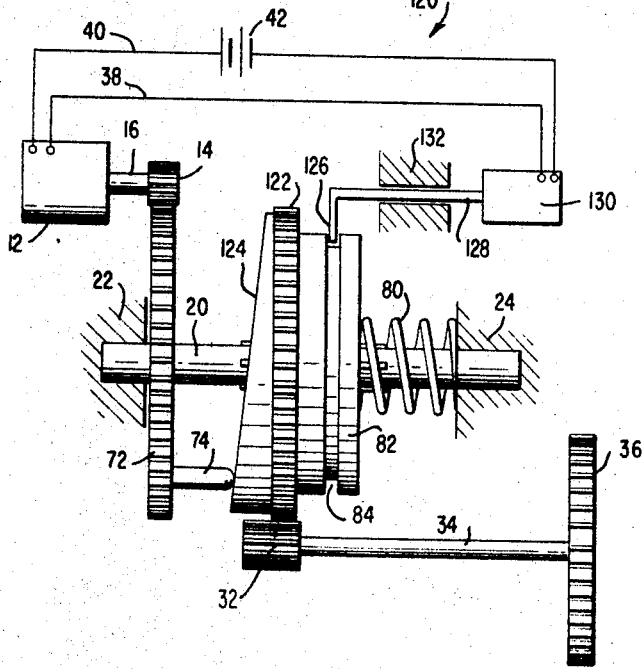
INVENTOR
JOHN L. KLINCK
BY *LeBlanc & Shur*
ATTORNEYS

United States Patent Office 3,474,618
Patented Oct. 28, 1969

3,474,618
REWIND MECHANISM FOR AN ELECTRIC TIMEPEACE
John L. Klinck, Lancaster, Pa., assignor to Hamilton Watch Company, Lancaster, Pa., a corporation of Pennsylvania
Filed Apr. 28, 1967, Ser. No. 634,610
Int. Cl. G04c 1/00
U.S. Cl. 58—41                                    6 Claims

ABSTRACT OF THE DISCLOSURE

Disclosed is a rewind mechanism for electrically operated spring driven timepieces. The system is run from a DC motor and is provided with snap action switches to minimize contact arcing. Rewind occurs only after the mainspring barrel has rotated almost one complete revolution.

---

This invention relates to an improved rewind mechanism for electrically driven clocks, watches, timers, and the like and more particularly to an improved rewind mechanism for a battery operated timepiece having a simplified and inexpensive construction, lower power consumption, small size, and long life. The rewind mechanism of this invention is particularly suited for use in a spring driven timepiece in which the mainspring is periodically rewound by a DC electric motor and provides a construction in which there is no constant drain of the battery and the switch is closed to energize the electric motor during rewind with a minimum of arcing.

Battery operated timepieces are well known and are gaining wider and wider acceptance for use as watches, clocks, timers, meters and the like. While taking a wide variety of forms, the so-called "cordless" timepieces in general utilize some type of electric motor or drive energized from a battery mounted in the unit. One common type of so-called "cordless" clock utilizes a stall motor to periodically rewind the mainspring of the clock which mainspring drives the watch train in a more or less conventional manner, during the intervals when the mainspring is not being rewound. However, a serious disadvantage to this type of device is that the stall motor is constantly coupled in the circuit with the battery and exerts a constant drain on the battery, tending to shorten battery life.

Other cordless timepieces incorporating solenoid rewind mechanisms and DC type motor drives, have other disadvantages including the fact that substantial arcing occurs as the rewind contacts open and close. Because of excessive arcing, contact life is greatly reduced.

The present invention provides a novel rewind mechanism avoiding these and other problems of previously known constructions. In the present invention, a DC electric motor is periodically energized to rewind the mainspring of a cordless type timing unit such as a cordless clock. In this way, the electric motor does not constantly drain power from the battery power supply. At the same time, the contacts to the electric motor are positively actuated under the influence of spring pressure, so as to provide a rapid or snap type closure and opening of the switch contacts. This greatly prolongs contact life as arcing is kept to a minimum.

Important features of the present invention in addition to lower power consumption and a minimum of arcing between contacts, include the fact that the rewind mechanism is of relatively simplified and inexpensive construction. It may be made in small size and weight, particularly adapted for aerospace and other military timing environments. Switch actuation is rapidly and reliably effected through a simplified camming arrangement which utilizes a minimum of energy for its operation. The mainspring barrel is permitted to undergo almost a full 360° revolution before the electric motor is energized to again rewind the mainspring during each cycle of operation.

It is, therefore, one object of the present invention to provide an improved rewind mechanism for electrically operated timepieces.

Another object of the present invention is to provide a simplified and inexpensive rewind mechanism for battery operated timepieces.

Another object of the present invention is to provide apparatus for rewinding the mainspring of a timepiece having reduced power consumption and increased switch life due to a minimum of arcing between switch contacts.

Another object of the present invention is to provide apparatus in the form of a battery and electric motor for periodically rewinding the mainspring of a cordless clock or the like wherein the electric circuit from the battery to the motor is completed and opened by means of a snap actuated switch. The switch is energized under the influence of a cam turned in synchronism with the rotation of the output shaft driving the timepiece train and acts under the influence of a spring to positively and rapidly open and close the circuit. The gear driving the timepiece train undergoes almost a full revolution before rewind is effected.

These and further objects and advantages of the invention will be more apparent upon reference to the following specification, claims and appended drawings wherein:

FIGURE 4 is a view similar to that of FIGURE 1 showing a modified rewind mechanism constructed in accordance with the present invention;

FIGURE 5 is a view similar to that of FIGURE 3 showing the mainspring barrel of FIGURE 4 with the cover removed to illustrate the mainspring and splined collar on the winding shaft; and FIGURE 6 is a partially diagrammatic view of a further modified rewind mechanism constructed in accordance with the present invention.

Figure 1:
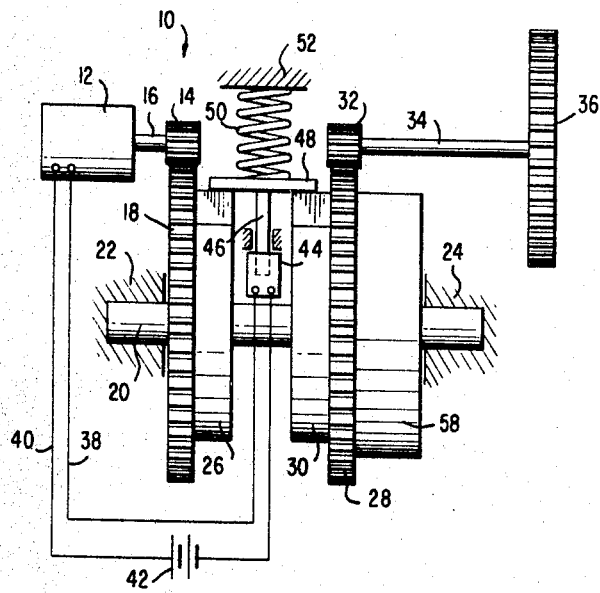
FIGURE 1 is a partially diagrammatic view showing the novel rewind mechanism of the present invention.
Figure 2:
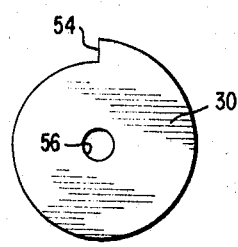
FIGURE 2 is an end view of one of the cams of the rewind mechanism of FIGURE 1.
Figure 3:
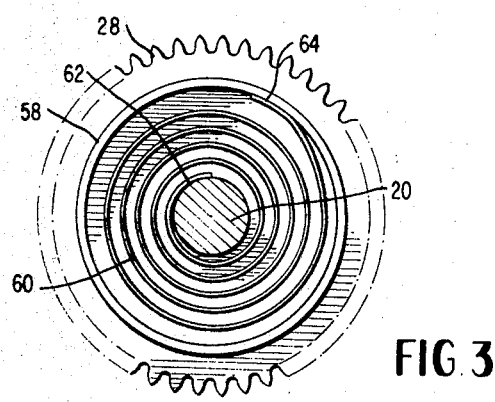
FIGURE 3 is an end view of the mainspring barrel in the mechanism of FIGURE 1 with the cover removed to show the mainspring.

Referring to the drawings and particularly to FIGURES 1–3, the novel rewind mechanism of the present invention, generally indicated at 10 in FIGURE 1, comprises a DC electric motor 12 driving a pinion 14 by way of shaft 16. Pinion 14 meshes with and drives a gear wheel 18 rigidly secured to a winding arbor or shaft 20 mounted at one end in a bearing support generally indicated by hatching at 22 and at its other end in a similar bearing support generally indicated by hatching at 24. Rigid with the shaft 20 and gear wheel 18 and rotatable therewith, is a switch opening cam 26.

Rotatable about shaft 20 is a second gear wheel 28 rigidly secured to and carrying with it, a switch closing cam 30. The teeth of gear wheel 28 mesh with the teeth on a pinion 32 and the pinion 32 is driven by the gear wheel 28. The pinion, in turn, acts through a shaft 34 to drive an output gear wheel 36. By way of example only, output gear wheel 36, which is the output gear wheel for the rewind mechanism, may constitute the fourth wheel of a conventional watch or clock train.

Electrically connected ot DC motor 12 by way of leads 38 and 40, is a power supply 42 illustrated as a battery. In series with the battery 42 and motor 12, is a swtich 44 which opens and closes to alternatively break and complete the electric circuit from the battery 42 to the motor 12. When the switch 44 is closed, the electric motor is energized to rotate shaft 16 and drive pinion 14. Switch 44 is of conventional construction and is of the type generally described as "push-on push-off" meaning that the switch is alternately opened and closed each time the actuator rod 46 is depressed or pushed into the swtich. Connected to actuator rod 46 is a cam follower 48 which is urged into engagement with one or both of the cam surfaces on cams 26 and 30 by a coiled compression spring 50. The other end of this spring bears against and is preferably secured to a suitable support generally indicated at 52.

As illustrated in FIGURE 2, cam 30 is stepped cylindrical cam having the step 54 and a central aperture 56 for receiving shaft 20. Cam 26 is of similar construction to cam 30 with the exception that cam 26 is rigidly secured to the shaft 20, whereas cam 30 is freely mounted on the shaft for rotation about it.

Rigidly secured to the gear wheel 28 and rotatable about shaft 20 with the gear wheel and the cam 30, is mainspring barrel 58. As best seen in FIGURE 3, mainspring barrel 58 houses a coiled mainspring 60 having its inner end secured to the shaft 20 as at 62 and its outer end secured to the inside wall of the mainspring barrel 58 as at 64 in FIGURE 3.

Operation of the rewind mechanism illustrated in FIGURES 1–3 is as follows: When actuator rod 46 is depressed to close the switch 44 and complete the circuit, electric motor 12 is energized causing pinion 14 to rotate gear wheel 18 and consequently shaft 20. Rotation of shaft 20 is through almost a full 360° and acts to wind the mainspring 60 within the mainspring barrel 58. At the same time, cam 26 rotates with the gear wheel 18, causing the cam follower 48 to ride upon the surface of the cam to withdraw actuator rod 46 from the switch 44. When the cam 26 has completed almost one complete revolution, cam follower 48 rides over the step 54 and drops off to the innermost portion of the cam surface. At this time, spring 50 urges actuator rod 46 inwardly into the switch 44 opening the circuit and de-energizing electric motor 12.

Mainspring 60 in mainspring barrel 58 gradually unwinds rotating the mainspring barrel and the gear wheel 28 to which it is connected. This drives pinion 32 and output gear wheel 36 through shaft 34 in a controlled manner through a conventional watch or clock type gear train and escapement. As the mainspring barrel rotates, so does cam 30 and cam follower 48 rides up to the outermost surface of the cam 30 withdrawing actuator rod 46 from the switch 44. After the cam 30 has completed almost one full revolution, cam follower 48 drops over the cam step 54 and the actuator rod 46 is again moved inwardly under the influence of spring 50. The inward movement of the actuator rod 46 again closes the switch 44, completes the circuit to electric motor 12, and initiates the next cycle of operation in which the actions previously described are repeated. The spring 50 acts in a positive manner in conjunction with the steps on the cams 26 and 30 to positively and rapidly open and close the switch 44 with a snap action so as to avoid excessive arcing in the circuit. A further important feature resides in the fact that as the mainspring 60 unwinds, the electric motor 12 is not energized and does not constitute any type of a drain on the power supply or battery 42.

FIGURE 4 shows a modified embodiment with like parts bearing like reference numerals. The rewind mechanism generally indicated at 70 in FIGURE 4 again comprises the DC electric motor 12 energized by battery 42. Output from the unit is by way of shaft 34 to output gear wheel 36 as in the previous embodiment.

The embodiment of FIGURE 4 differs from that previously described in that the pinion 14 drives a modified gear wheel 72 provided with an integral cam follower 74. As before, gear wheel 72 is rigid with the shaft 20 and rotates with it.

Mounted for rotation about shaft 20, is a gear wheel 76 meshing with and driving the pinion 32. Formed integral with the gear wheel 76, is a helical step cam 78 which engages the cam follower 74 on the gear wheel 72. Step cam 78 is urged against cam follower 74 by a helical compression spring 80 having one end secured to the support bearing 24 and its other end bearing against a modified mainspring barrel 82. The modified mainspring barrel 82 is provided with an annular groove 84 receiving one end of a lever 86. Lever 86 is pivoted as at 88 about a support 90 and its other end is received in a slot 92 in a rotatable disc 94 mounted on support bearing 96. Spaced 180° from the slot 92, is a second slot 98 in the rotatable disc 94 which receives one end of an over center or conventional knee spring 100. The other end of the knee spring 100 rides in a notch 102 in support member 104.

As best seen in FIGURE 5, the mainspring 60 has its outer end connected to the modified mainspring barrel 82 and its inner end connected to a collar 106 on shaft 20. The collar 106 is splined to the shaft 20 as indicated at 108 in FIGURE 5 so that the collar 106 rotates with the shaft 20 but is free to slide along it.

Mounted on the rotatable disc 94, is an arm 110, which carries the movable contact 112 of a switch generally indicated at 114 also provided with stationary contact 116. Closure of contacts 112 and 116 completes the circuit from the battery 42 to the motor 12 by way of leads 38 and 40.

Operation of the modified embodiment illustrated in FIGURES 4 and 5 is similar to that previously described. When contacts 112 and 116 are closed, the motor 12 is energized to rotate gear wheel 72 and shaft 20 which acts to wind the mainspring 60 within the mainspring barrel 82. As gear wheel 72 rotates, cam follower 74 rides up on step cam 78 moving the step cam 78 and mainspring barrel 82 to the right in the direction of the arrow 118 in FIGURE 4 to compress spring 80. Translation of the mainspring barrel 82 rocks lever 86 and stresses knee spring 100, such that after the gear wheel 72 has rotated approximately 300°, knee spring 100 becomes unstable and snaps over rotatable disc 94 in a clockwise direction to snap contact 112 away from contact 116 to break the circuit and de-energize the electric motor 12.

As the mainspring 60 unwinds, gear wheel 76 rotates and through pinion 32 drives output gear wheel 36. At the same time, cam follower 74, which is now stationary with the pinion 14 and de-energized motor 12, moves downwardly on the cam surface 78 and gear wheel 76 rotates such that helical compression spring 80 urges gear wheel 76 and mainspring barrel 82 in a direction opposite to arrow 118 in FIGURE 4. After approximately 300° of rotation of gear wheel 76, the over center or knee spring 100 again becomes unstable due to the urging of lever 86 riding in annular groove 84 and snaps rotatable disc 94 in a counter clockwise direction to rapidly close contacts 112 and 116 to again energize the motor 12. With the motor 12 energized, the cycle described above is repeated.

FIGURE 6 shows a further modified embodiment of the present invention with like parts again bearing like reference numerals. The rewind mechanism of FIGURE 6 generally indicated at 120, again comprises the battery 42 for energizing electric motor 12 to drive gear wheel 72 by way of pinion 14. As before, gear wheel 74 is rigidly mounted to shaft 20 so that it rotates with the shaft. Output to the watch train is from pinion 32 by way of shaft 34 to the gear wheel 36 which may constitute the fourth wheel of a conventional watch or clock gear train.

Mainspring barrel 82 is constructed in the same manner as in the previous embodiment of FIGURES 4 and 5 and is urged to the left in FIGURE 6 by the helical compression spring 80. The mainspring barrel 82 is rotatably mounted on the shaft 20 and encloses a mainspring 60 in the manner illustrated in FIGURE 5 having one end connected to the mainspring barrel 82 and its other end connected to a collar 106 such as collar 106 of FIGURE 5 splined to the shaft 20. Attached to the mainspring barrel 82 and rotatable with it, about shaft 20, is a gear wheel 122 having teeth meshing with the pinion 32 so that when the gear wheel 122 rotates, it drives the pinion 36. Gear wheel 122 is provided with a cam surface 124 which is urged against cam follower 74 on gear wheel 72 by helical compression spring 80.

Received in annular groove 84 on the mainspring barrel 82, is the arm 126 of a push rod 128 which serves as an actuator for a "push-on-push-off" switch 130. Push rod 128 is slidable in a support generally indicated at 132 and switch 130 opens and closes to periodically complete the circuit from the battery 42 to the DC electric motor 12. Switch 130 is of conventional construction and is provided with an internal spring system for snap closure and snap opening. It alternatively opens and closes each time the actuator rod or push rod 128 is pushed inwardly into the switch.

In the operation of the embodiment illustrated in FIGURE 6, when the electric motor 12 is energized, pinion 14 rotates gear wheel 72 and shaft 20 to wind the mainspring in mainspring barrel 82. At the same time, cam follower 74 rides from near the highest point to the lowest point on the cam surface 124 and then back near the highest point on the cam 124. Approximately 300° rotation of the gear wheel 72 causes gear wheel 122 and mainspring barrel 82 to first be urged to the left in FIGURE 6 under the influence of helical compression spring 80 and then back to the right as the cam follower 74 first rides down to the low point of the cam 124 and then back up to near the high point. This results in the push rod 128 first being withdrawn from switch 130 and pushed back into it to open the circuit to the electric motor 12 so as to de-energize the motor 12.

With the motor 12 de-energized, the mainspring 60 unwinds rotating mainspring barrel 82 and gear wheel 122 to drive the output gear wheel 36. As gear wheel 122 rotates, cam follower 74 again rides down the cam 124 to its lowest point and then back up to near its highest point causing push rod 128 to again first be withdrawn from the switch 120 and then pushed in to close the circuit and re-energize the motor 12. When the motor 12 is re-energized after about 300° rotation of gear wheel 122 the cycle described above is repeated.

Push-on-push-off switches of the types illustrated at 44 in FIGURE 1 and at 130 in FIGURE 6 are commercially available, both with and without internal snap action operating mechanisms. In the embodiment of FIGURE 6, switch 130 is of the type having an internal snap operation. In the embodiment illustrated in FIGURE 1, switch 44 is of the type having no internal snap operation. For this reason, the actuator rod 46 in FIGURE 1, is biased by spring 50 and the cams 26 and 30 are stepped to provide snap opening and snap closure in the switch. It is obvious that if a switch of the type illustrated at 130 in FIGURE 6 is substituted for the switch 44 in FIGURE 1, then the cams 26 and 30 need not be stepped. Similarly, while a specific knee spring type action is illustrated in FIGURE 4 for closing contacts 112 and 116, other snap action operated mechanisms may be used in the system of FIGURE 4. For example, a snap action switch of the type disclosed in U.S. Patent 2,146,119 may be utilized. Other commercial snap switches may also be substituted for the knee action switch illustrated in the system of FIGURE 4.

It is apparent from the above that the present invention provides an improved rewind mechanism for all types of timepieces and timing devices and one particularly suited for so-called "cordless" clocks that are spring driven and in which the main-spring is periodically rewound by an electrical drive or motor. Important features of the present invention include the fact that the unit imparts a very small power drain to significantly increase the life of the battery while, at the time, snap closure minimizes arcing of the contacts both during opening and closing. These are all provided in a relatively simplified and inexpensive structure which operates reliably and permits the output gear and barrel to rotate approximateluy 300° or more before the rewind mechanism is actuated. This provides optimum efficiency and permits the mainspring to substantially unwind in a more or less conventional manner before rewinding is effected. The rewind mechanism is completely compatible with most existing timing systems and is directly connectible into the conventional escapement controlled gear train such as by connecting the pinion 32 to the output gear wheel or fourth wheel 36 of a conventional watch or clock train.

In some instances, it may be desirable to include an additional pinion and gear between pinion 14 and gear wheel 18 (or 72) to provide a more convenient gear ratio for more efficient power transfer.

What is claimed is:

1. A rewind mechanism for timepieces comprising a mainspring barrel rotatably mounted on a winding shaft, a mainspring having one end coupled to said barrel and its other end coupled to said shaft, a DC electric motor coupled to said shaft for rotating said shaft to wind said mainspring, a snap action switch connected to said motor for periodically coupling said motor to a power supply, first means rotatable with said shaft and coupled to said switch for opening said switch after a predetermined rotation of said shaft, second means rotatable with said barrel and coupled to said switch for closing said switch after a predetermined rotation of said barrel, and a first gear wheel rigidly mounted on said shaft, a second gear wheel rotatably mounted on said shaft with said barrel, a cam on one of said wheels, a cam follower on the other of said wheels, and means resiliently urging said wheels toward each other.

2. A rewind mechanism according to claim 1 wherein said second wheel and barrel are joined, a sring urging said second wheel and barrel toward said first wheel, said barrel having an annular groove, and means engaged in said groove and coupled to said switch for actuating said switch in response to translational movement of said barrel along said shaft.

3. A rewind mechanism according to claim 2 wherein said cam is stepped.

4. A rewind mechanism according to claim 2 wherein said cam is continuous.

5. A rewind mechanism for timepieces comprising a mainspring barrel rotatably mounted on a winding shaft, a mainspring having one end coupled to said barrel and its other end coupled to said shaft, a DC electric motor coupled to said shaft for rotating said shaft to wind said mainspring, a push-on push-off switch connected to said motor for periodically coupling said motor to a power supply and having a switch actuating cam follower, a first gear wheel, and a first cam rotatable with said shaft, a second gear wheel and a second cam rotatably mounted on said shaft for unitary movement with said barrel, means biasing said cam follower into a predetermined position in engagement with said first and second cams, and output gear coupled to said second gear wheel, said first cam being operable to displace said cam follower from said predetermined position to open said switch and deenergize said motor after a rotation of said shaft of about 360 degrees, said second cam being rotatable with said barrel to displace said cam follower from said predetermined position to close said switch after a predetermined rotation of said barrel.

6. A timepiece mechanism according to claim 5 wherein said cams are stepped.

References Cited

UNITED STATES PATENTS

| | | | |
|---|---|---|---|
| 2,073,782 | 3/1937 | Cole et al. | 58—41 |
| 3,261,935 | 7/1966 | Rogers | 58—41 |

RICHARD B. WILKINSON, Primary Examiner

EDITH C. SIMMONS, Assistant Examiner

U.S. Cl. X.R.

58—23